US007311969B2

(12) United States Patent
Masuda et al.

(10) Patent No.: US 7,311,969 B2
(45) Date of Patent: Dec. 25, 2007

(54) SEMICONDUCTIVE MEMBER AND ELECTROPHOTOGRAPHIC APPARATUS

(75) Inventors: Yoshitomo Masuda, Tokyo (JP); Gaku Yakushiji, Tokyo (JP); Takao Ohuchi, Tokyo (JP); Hajime Kitano, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 960 days.

(21) Appl. No.: 10/112,743

(22) Filed: Apr. 2, 2002

(65) Prior Publication Data

US 2002/0142134 A1 Oct. 3, 2002

(30) Foreign Application Priority Data

| | | |
|---|---|---|
| Apr. 2, 2001 | (JP) | 2001-103777 |
| Apr. 2, 2001 | (JP) | 2001-103832 |
| Apr. 2, 2001 | (JP) | 2001-103864 |
| Apr. 2, 2001 | (JP) | 2001-103919 |
| Aug. 30, 2001 | (JP) | 2001-260862 |
| Aug. 30, 2001 | (JP) | 2001-260863 |

(51) Int. Cl.
*B32B 9/00* (2006.01)
*G03G 13/00* (2006.01)

(52) U.S. Cl. ...................................... 428/411.1; 430/31

(58) Field of Classification Search ............. 428/423.1, 428/423.5, 423.7, 424.4, 425.9, 411.1; 430/31
See application file for complete search history.

(56) References Cited

U.S. PATENT DOCUMENTS 5,604,074 A * 2/1997 Yasuda et al. .............. 430/120
6,020,054 A * 2/2000 Masuda et al. .......... 428/319.3

* cited by examiner

*Primary Examiner*—Thao Tran
(74) *Attorney, Agent, or Firm*—Sughrue Mion Pllc.

(57) ABSTRACT

In a semiconductive member having a coating film containing a conductive agent formed on the surface of a substrate such as an elastic material, or a semiconductive member having an elastic material as a substrate containing a conductive agent, the conductive agent is coated with an ion-containing resin or a resin having high charge attenuation properties.

6 Claims, 7 Drawing Sheets

FIG. 3

| | | EXAMPLE 1-1 | EXAMPLE 1-2 | REFERENCE EXAMPLE 1-1 | REFERENCE EXAMPLE 1-2 | COMPARATIVE EXAMPLE 1-1 | COMPARATIVE EXAMPLE 1-2 | COMPARATIVE EXAMPLE 1-3 |
|---|---|---|---|---|---|---|---|---|
| CB ADDED TO RESIN LAYER Y | TYPE | B | C | D | B | E | F | — |
| | TYPE OF COATING RESIN | EAU65B/HX /KS555 | DP307/HX /KS555 | EAU65B /KS555 | EAU65B/HX /KS555 | EAU65B/HX | DP307/HX | NONE |
| | AMOUNT OF RESIN APPLIED | 4% | 5% | 62% | 4.5% | 6% | 6% | — |
| | SOLVENT INSOLUBILITY | 92% | 90% | 62% | 92% | 89% | 64% | — |
| SURFACE ROUGHNESS OF ROLLER (Rz) | | 2 μm | 2 μm | 2 μm | 8 μm | 2 μm | 2 μm | 5 μm |
| RESISTANCE OF ROLLER | | $5\times10^6\,\Omega$ | $9\times10^6\,\Omega$ | $6\times10^6\,\Omega$ | $6\times10^6\,\Omega$ | $2\times10^7\,\Omega$ | $3\times10^7\,\Omega$ | $6\times10^6\,\Omega$ |
| VARIATION IN RESISTANCE OF ROLLER | | 0.1 DIGIT | 0.1 DIGIT | 0.1 DIGIT | 0.15 DIGIT | 0.3 DIGIT | 0.35 DIGIT | 1.3 DIGIT |
| CONDITION OF IMAGE (HALF-TONE IMAGE) | | UNIFORM | UNIFORM | UNIFORM | VERY SLIGHTLY NONUNIFORM | NONUNIFORM A LITTLE | NONUNIFORM A LITTLE | NONUNIFORM |
| RESULT OF CONTAMINATION TEST | | OK | — | NG | — | — | — | — |

FIG.5

| | | EXAMPLE 2-1 | EXAMPLE 2-2 | REFERENCE EXAMPLE 2-1 | REFERENCE EXAMPLE 2-2 | REFERENCE EXAMPLE 2-3 | REFERENCE EXAMPLE 2-4 | COMPARATIVE EXAMPLE 2 |
|---|---|---|---|---|---|---|---|---|
| CB ADDED TO RESIN LAYER Y | TYPE | B | C | D | E | F | B | – |
| | TYPE OF COATING RESIN | EAU65B/HX | DP307/HX | EAU65B/HX | AER6071 /SUMICURE M | EAU65B | EAU65B/HX | NONE |
| | AMOUNT OF RESIN APPLIED | 4% | 4% | 62% | 6% | 6% | 4% | – |
| | CHARGED POTENTIAL OF RESIN | 8V | 7V | 8V | 370V | 10V | 8V | – |
| | SOLVENT INSOLUBILITY | 92% | 90% | 92% | 89% | 64% | 92% | – |
| SURFACE ROUGHNESS OF ROLLER (Rz) | | 2 μm | 2 μm | 2 μm | 3 μm | 2 μm | 8 μm | 5 μm |
| RESISTANCE OF ROLLER | | $4\times10^{6}\,\Omega$ | $7\times10^{6}\,\Omega$ | $5\times10^{9}\,\Omega$ | $1\times10^{10}\,\Omega$ | $6\times10^{6}\,\Omega$ | $2\times10^{8}\,\Omega$ | $3\times10^{6}\,\Omega$ |
| VARIATION IN RESISTANCE OF ROLLER | | 0.15 DIGIT | 0.14 DIGIT | 0.31 DIGIT | 0.24 DIGIT | 0.2 DIGIT | 0.7 DIGIT | 1.2 DIGIT |
| CONDITION OF IMAGE (WHITE-TONE IMAGE) | | NORMAL | NORMAL | ALMOST NORMAL | ALMOST NORMAL | NORMAL | SLIGHT FORMATION OF SAND-LIKE PATTERN | FORMATION OF SAND-LIKE PATTERN |
| RESULT OF CONTAMINATION TEST | | OK | — | — | — | NG | — | — |

FIG.7

| | EXAMPLE 3-1 | EXAMPLE 3-2 | REFERENCE EXAMPLE 3-1 | COMPARATIVE EXAMPLE 3-1 | COMPARATIVE EXAMPLE 3-2 |
|---|---|---|---|---|---|
| ELASTIC ROLLER | A | B | C | D | E |
| TYPE OF COATING RESIN | EAU65B/HX/KS555 | DP307/HX/KS555 | EAU65B/KS555 | EAU65B/HX | NONE |
| AMOUNT OF RESIN APPLIED | 5% | 5% | 5% | 6% | 0 |
| SOLVENT INSOLUBILITY | 91% | 89% | 48% | 89% | — |
| RESISTANCE OF ROLLER | $4 \times 10^6$ Ω | $7 \times 10^6$ Ω | $5 \times 10^6$ Ω | $7 \times 10^8$ Ω | $2 \times 10^6$ Ω |
| VARIATION IN RESISTANCE OF ROLLER | 0.1 DIGIT | 0.11 DIGIT | 0.15 DIGIT | 0.29 DIGIT | 1.3 DIGIT |
| RESULT OF CONTAMINATION TEST | OK | — | NG | — | — |

FIG.8

| | EXAMPLE 4-1 | EXAMPLE 4-2 | REFERENCE EXAMPLE 4-1 | REFERENCE EXAMPLE 4-2 | REFERENCE EXAMPLE 4-3 | COMPARATIVE EXAMPLE 4 |
|---|---|---|---|---|---|---|
| ELASTIC ROLLER | A | B | C | D | E | F |
| TYPE OF COATING RESIN | EAU65B/HX | DP307/HX | EAU65B/HX | AER6071/ SUMICURE M | EAU65B | なし |
| AMOUNT OF RESIN APPLIED | 4% | 4% | 48% | 6% | 6% | 0 |
| CHARGED POTENTIAL OF RESIN | 8V | 7V | 8V | 230V | 10V | — |
| SOLVENT INSOLUBILITY | 92% | 90% | 92% | 89% | 64% | — |
| RESISTANCE OF ROLLER | $5\times10^8\ \Omega$ | $7\times10^8\ \Omega$ | $2\times10^{11}\ \Omega$ | $1\times10^{12}\ \Omega$ | $6\times10^8\ \Omega$ | $2\times10^8\ \Omega$ |
| VARIATION IN RESISTANCE OF ROLLER | 0.2 DIGIT | 0.15 DIGIT | 0.3 DIGIT | 0.4 DIGIT | 0.2 DIGIT | 1.4 DIGIT |
| RESULT OF CONTAMINATION TEST | OK | — | — | — | NG | — |

SEMICONDUCTIVE MEMBER AND ELECTROPHOTOGRAPHIC APPARATUS

BACKGROUND OF THE INVENTION

1. Field of the Invention

The present invention relates to a semiconductive member having a coating film containing a conductive agent formed on the surface of a substrate such as an elastic material or a semiconductive member having a substrate composed of an elastic material and containing a conductive agent, such as a charge roller, development roller, transfer roller, toner feed roller or discharge roller mainly used as a member of an electrophotographic apparatus, and to an electrophotographic apparatus comprising the semiconductive member.

2. Description of the Prior Art

Members such as a charge roller, development roller, transfer roller, discharge roller and development blade have been used in an electrophotographic apparatus such as a printer, copier or facsimile. These members must have a resistance value within a semiconductive range.

In general, to control the resistance value of the above semiconductive member, various methods have been employed: one in which a resistance control layer, for example, a coating film is formed on an elastic material which is a substrate, a conductive material such as an ion, carbon or metal oxide is contained in the resistance control layer and the amount of the conductive material is controlled, and one in which a conductive material such as an ion, carbon or metal oxide is contained in an elastic material such as urethane or rubber which is a substrate and the amount of the conductive material is controlled.

However, when an ion is used, a variation in resistance is small but only a relatively high resistance range can be covered and the resistance is readily affected by the surrounding environment. In addition, the resistance is readily changed by energization and the ion readily bleeds to become a contamination source.

Meanwhile, when carbon or metal oxide is used, there are a lot of advantages that the resistance is hardly affected by the surrounding environment, the resistance is rarely changed by energization, a contamination problem rarely occurs, and a required resistance range can be covered. However, a variation in resistance is large and dependence of resistance on voltage is large. Then, in order to improve reproducibility and stability of resistance, attempts to add a dispersant together with the above conductive material are being studied. However, a new problem arises that the above additive itself readily becomes a contamination source.

It is an object of the present invention which has been made in view of the above problem to provide a semiconductive member having a small variation in resistance and stable resistance, which is advantageously used as a charge roller or development roller by modifying a conductive agent to be contained in a resistance control layer which is a coating layer or a conductive agent to be contained in an elastic material which is a substrate as well as an electrophotographic apparatus comprising this semiconductive member.

SUMMARY OF THE INVENTION

According to a first aspect of the invention, there is provided a semiconductive member having a coating film containing a conductive agent formed on the surface of a substrate, wherein the conductive agent is coated with an ion-containing resin. A semiconductive member having a small variation in resistance can be obtained stably by forming a resistance control layer which is the above coating film formed on the surface of a substrate such as an elastic material.

According to a second aspect of the invention, there is provided a semiconductive member having a coating film containing a conductive agent formed on the surface of a substrate, wherein the conductive agent is coated with a resin having high charge attenuation properties. This makes it possible to obtain a semiconductive member having a small variation in resistance stably.

According to a third aspect of the invention, there is provided a semiconductive member having a coating film containing a conductive agent formed on the surface of a substrate, wherein the resin having high charge attenuation properties is a resin whose maximum surface potential value becomes 300 V or less 0.3 second after the surface of the resin is charged by corona discharge generated by applying a voltage of 8 kV to a corona discharger spaced 1 mm apart from the surface of the resin.

According to a fourth aspect of the invention, there is provided a semiconductive member having a coating film containing a conductive agent formed on the surface of a substrate, wherein the semiconductive member has a surface roughness of 4 μm or less.

According to a fifth aspect of the invention, there is provided a semiconductive member having an elastic material as a substrate containing a conductive agent, wherein the conductive agent is coated with an ion-containing resin.

According to a sixth aspect of the invention, there is provided a semiconductive member having an elastic material as a substrate containing a conductive agent, wherein the conductive agent is coated with a resin having high charge attenuation properties.

According to a seventh aspect of the invention, there is provided a semiconductive member having an elastic material as a substrate containing a conductive agent, wherein the resin having high charge attenuation properties is a resin whose maximum surface potential becomes 300 V or less 0.3 second after the surface of the resin is charged by corona discharge generated by applying a voltage of 8 kV to a corona discharges spaced 1 mm apart from the surface of the resin.

According to an eighth aspect of the invention, there is provided a semiconductive member, wherein the amount of the resin applied to the conductive agent is 0.01 to 50 wt % based on the above conductive agent.

According to a ninth aspect of the invention, there is provided a semiconductive member, wherein the conducive agent is at least one of carbon, metal powder and metal oxide, or a mixture thereof.

According to a tenth aspect of the invention, there is provided a semiconductive member, wherein in the conductive agent coated with the above resin, the solvent insolubility of the resin component represented by the following relational expression is 50% or more:

$$\text{solvent insolubility } (\%)=(B/A)\times 100$$

wherein A is the weight of the resin component contained in the resin coated conductive agent before immersion in a solvent and B is the weight of the resin component after the resin coated conductive agent is immersed in a good solvent at 25° C. for 24 hours.

According to an eleventh aspect of the invention, there is provided an electrophotographic apparatus comprising the semiconductive member of any one of the above aspects 1 to 10.

Other objects and advantages of the present invention will become apparent from the following description when taken in conjunction with the accompanying drawings.

BRIEF DESCRIPTION OF THE ACCOMPANYING DRAWINGS

FIGS. 1(*a*) and 1(*b*) are diagrams showing the constitution of a semiconductive member according to the present invention;

FIG. 3 is a table showing the results of a trially produced semiconductive member according to Embodiment 1 of the present invention;

FIG. 5 is a table showing the results of a trially produced semiconductive member according to Embodiment 2 of the present invention:

Figure 6A:
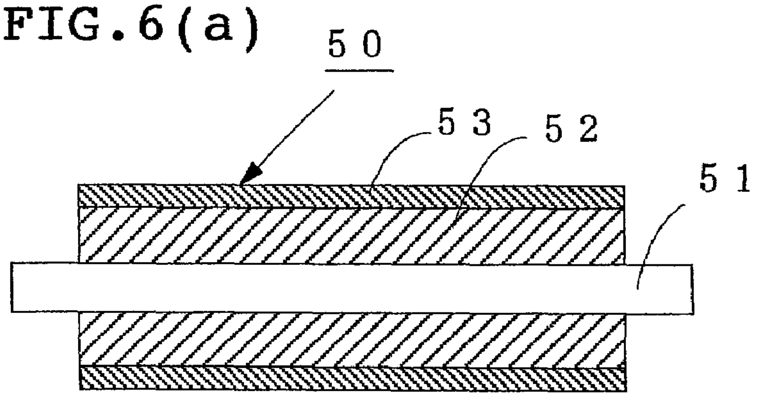
Figure 6B:
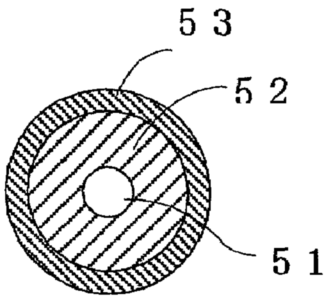

FIGS. 6(*a*) and 6(*b*) are diagrams showing the constitution of another semiconductive member according to the present invention;

FIG. 7 is a table showing the results of a trially produced semiconductive member according to Embodiment 3 of the present invention; and FIG. 8 is a table showing the results of a trially produced semiconductive member according to Embodiment 4 of the present invention.

DETAILED DESCRIPTION OF THE PREFERRED EMBODIMENTS

Preferred embodiments of the present invention will be described hereinbelow with reference to the accompanying drawings.

Embodiment 1

Figure 1A:
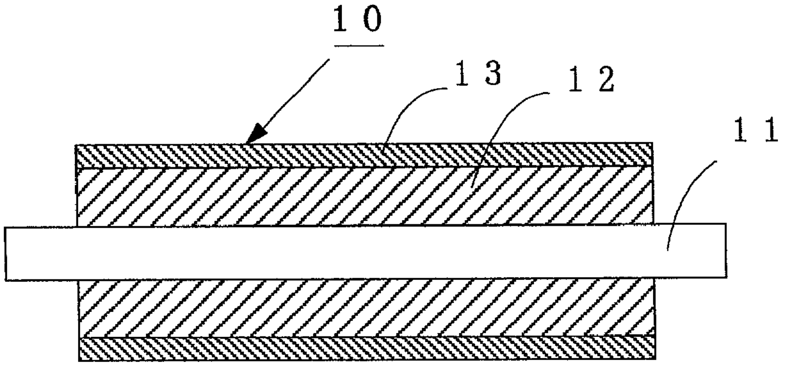
Figure 1B:
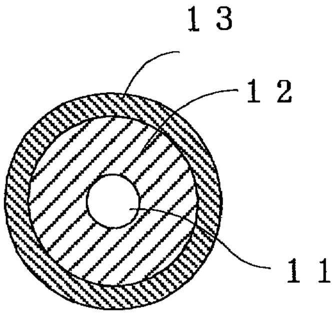

The semiconductive member of Embodiment 1 is used as a charge roller, development roller, transfer roller, discharge roller or development blade for use in an electrophotographic apparatus such as a printer, copier or facsimile and is generally shaped like a roll in most cases. When the semiconductive member is shaped like a roll, it is used as, for example, a charge roller 10 which comprises a metal or plastic shaft 11, an elastic layer 12 formed around the shaft 11, and a coating layer 13 made from a resin containing a conductive agent and formed on the surface of the above elastic layer 12 as shown in FIG. 1(*a*) and FIG. 1(*b*).

In this Embodiment 1, the coating layer containing a conductive agent coated with a resin is formed on the surface of an elastic material which is a substrate. That is, when the conductive agent coated with a resin is used as the above conductive agent, the dispersibility of the conductive agent can be controlled more easily and a variation in resistance and dependence of resistance on voltage can be made smaller than when a conductive agent such as carbon or metal oxide is used as it is.

The amount of the resin applied is 0.01 to 50 wt %, preferably 0.01 to 30 wt %, more preferably 0.01 to 20 wt % based on the conductive agent to be coated. Below the above range, a satisfactory dispersibility improving effect is not obtained and above the range, satisfactory conductivity is not obtained as will be described hereinafter.

If the resin is simply applied, conductivity intrinsic to the above conductive agent will be lost as a matter of course and the conductivity of the resistance control layer which is a coating film containing the conductive agent will be hardly exhibited though dispersibility can be controlled. Then, by selecting the following resin as a coating resin in Embodiment 1, an antimonic problem between dispersibility and conductivity is solved. That is, an ion is added to the resin for coating the conductive agent so that dispersibility is controlled by means of the coating resin and conductivity is compensated for by means of the above ion.

Any type of coating resin is acceptable if the ion to be described hereinafter is dissolved or dispersed in the resin. Examples of the coating resin include urethane resin, acrylic resin, polyester resin, urethane-modified acrylic resin, silicone resin, nylon resin, epoxy resin, styrene resin, butyral resin, vinylidene chloride resin, melamine resin, phenolic resin and fluororesin. These resins may be used alone or in combination of two or more. Urethane resin, fluororesin, silicone resin and urethane-modified acrylic resin are particularly preferred. It is preferred that at least one resin identical to the material forming the elastic layer to be described hereinafter should be contained.

Examples of the ion to be added to the coating resin include ammonium salts of perchlorates, chlorates, hydrochlorides, bromates, iodates, hydrogen borofluorides, sulfates, ethylsulfates, carboxylates and sulfonates such as tetraethyl ammonium, tetrabutyl ammonium, dodecyltrimethyl ammonium (such as lauryltrimethyl ammonium), hexadecyltrimethyl ammonium, octadecyltrimethyl ammonium (such as stearyltrimethyl ammonium), benzyltrimethyl ammonium and modified fatty acid dimethylethyl ammonium, and perchlorates, chlorates, hydrochlorides, bromates, iodates, borofluorates, trifluoromethyl sulfates and sulfonates of alkali metals and alkali earth metals such as lithium, sodium, potassium, calcium and magnesium.

These ions may be used alone or in combination of two or more. The amount of the ion added is not particularly limited but it is generally 0.01 to 30 parts by weight, preferably 0.01 to 15 parts by weight based on 100 parts by weigh of the resin.

The conductive agent to be coated is a so-called conductive material such as carbon, metal or metal oxide. Specific examples of the conductive agent include conductive carbons such as ketjen black and acetylene black, rubber carbons such as SAF, ISAF, HAF, FEF, GPF, SRF, FT and MT, oxidized ink carbon, pyrolytic carbon, natural graphite, metals such as nickel, copper, silver and germanium, and metal oxides such as antimony doped tin oxide, titanium oxide and zinc oxide.

As means of applying the above resin, a disper-coat and a coatmizer may be employed.

The disper-coat comprises a powder feed portion mounted in an upper portion and a multi-stage disperser capable of supplying a liquid from a horizontal direction in multiple stages and controls the operation conditions of the multistage disperser to adhere a liquid component containing a coating resin to the surface of a conductive powder supplied from the above powder feed portion or to wet the surface of a conductive powder with the liquid in a very short period of time.

The coatmizer supplies a conducive powder to be coated into a jet stream to form a dispersion layer, forms a spray flow of fine droplets containing the coating resin at a position parallel to the dispersion layer and brings it into collision with the above conductive powder so as to coat the surface of the above conductive powder with the resin.

As for the above conductive agent coated with the resin, the solvent insolubility of the above resin component represented by the following relational expression is preferably 50% or more, particularly preferably 70% or more.

$$\text{solvent insolubility } (\%) = (B/A) \times 100$$

wherein A is the weight of the resin component contained in the resin coated conductive agent before immersion in a solvent and B is the weight of the resin component after the resin coated conductive agent is immersed in a good solvent at 25° C. for 24 hours.

If the above solvent solubility is lower than 50%, when the semiconductive member of the present invention is used as a semiconductive roller such as a charge roller, development roller, transfer roller or discharge roller mounted to an electrophotographic apparatus such as a printer, copier or facsimile, a portion contacting a photosensitive body such as OPC will be contaminated and an image trouble will occur.

As the solvent for measuring the above solvent insolubility is preferably used methyl ethyl ketone for fluororesin, methanol for polyamide resin, methyl ethyl ketone or toluene for urethane-modified acrylic resin, acetone or isopropanol for melamine resin, or toluene for silicone resin.

Any type of resin may be used as the resin for forming the coating layer containing the above resin coated conductive agent. Specific examples of the resin include urethane resin, acrylic resin, polyester resin, urethane-modified acrylic resin, silicone resin, nylon resin, epoxy resin, styrene resin, butyral resin, vinylidene chloride resin, melamine resin, phenolic resin and fluororesin. These resins may be used alone or in combination of two or more. Urethane resin, fluororesin, silicone resin and urethane-modified acrylic resin are particularly preferred. A filler such as silica or calcium carbonate, plasticizer, aging inhibitor and pigment may be suitably blended as required.

The coating layer may be a single layer or a laminate consisting of multiple layers. Although the thickness thereof may be suitably selected, it is generally 0.5 to 500 μm.

This coating layer is formed by such methods as dipping in a coating, spraying or extrusion of a molten resin but the present inventing is not limited to these.

The resistance of the above coating layer is suitably selected but it is preferably controlled to a semiconductive range of $10^4$ to $10^{14}$ Ω·cm, particularly preferably $10^4$ to $10^9$ Ω·cm. In the semiconductive range where the resistance readily varies, a variation in resistance can be effectively reduced by adding the resin coated conductive agent of the present invention to the coating layer.

The elastic material for forming the elastic layer underlying the coating layer is not particularly limited if it has an elastic function, as exemplified by urethane rubber, silicone rubber, nitrile rubber, ethylene propylene rubber, ethylene propylene diene rubber, styrene butadiene rubber, butadiene rubber, isoprene rubber, natural rubber, acrylic rubber, chloroprene rubber, butyl rubber and epichlorohydrin rubber. They may be used alone or in combination of two or more. Urethane rubber, silicone rubber and ethylene propylene rubber are particularly preferred. A filler such as silica or calcium carbonate, plasticizer, crosslinking accelerator, aging inhibitor and pigment may be suitably blended as required.

The elastic material may be a foamed material. In this case, the density of the material is preferably 0.05 to 0.9 g/cm$^3$.

Since the object of the present invention is to reduce a variation in resistance, the semiconductive member is desirably uniform in shape and preferably has a 10-point average surface roughness Rz of 4 μm or less.

Figure 2:
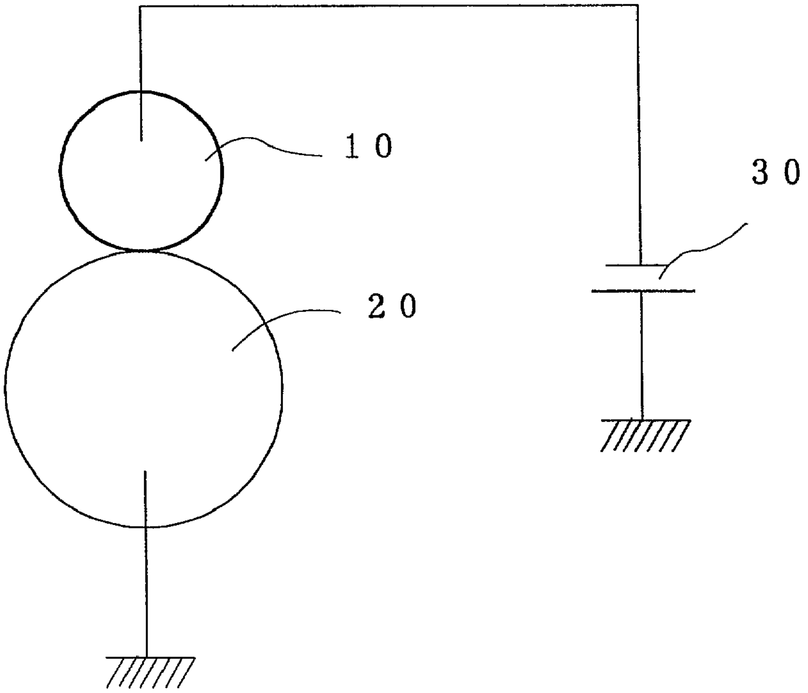
FIG. 2 is a schematic structural diagram of the charge unit of a printer according to the present invention.

The semiconductive member of the present invention is advantageously used as a member such as a charge roller, development roller, transfer roller, discharge roller or development blade for use in an electrophotographic apparatus such as a printer, copier or facsimile. More specifically, as shown in FIG. 2, the semiconductive member of the present invention is used as a charge unit for a printer constituted such that a charge roller 10 which is the semiconductive member of the present invention is turned together with a photosensitive drum (OPC drum) 20 while it is in contact with the drum 20, and DC or voltage obtained by superimposing AC upon DC is applied between the photosensitive drum 20 and the charge roller 10 by voltage application means 30 to charge the above photosensitive drum 20. Since the semiconductive member of the present invention has a small variation in resistance and stable resistance and hardly causes a contamination problem, an electrophotographic apparatus capable of obtaining an excellent image can be provided stably.

EXAMPLES

Examples of Embodiment 1 of the present invention and Comparative Examples are provided for the purpose of further illustrating the present invention but are in no way to be taken as limiting.

Example 1-1

A charge roller having a 100 μm-thick resin layer X formed on the surface of an elastic layer formed of a conductive urethane foam and a 10 μm-thick resin layer Y further formed on the resin layer X was manufactured.

The resin layer X was formed from a coating prepared by adding 30 phr of the following carbon (CB) type A resin coating to a resin prepared by mixing together the Bironal MD1930 water-dispersible polyester resin (of Toyobo Co., Ltd.) and the U40 water-dispersible urethane resin (of Sumitomo Viel Urethane Co., Ltd.) in a ratio of 7:3.

The resin layer Y was formed from a coating prepared by adding 12 phr of the following CB type B resin coating to a resin prepared by mixing together the EAU65B urethane-modified acrylic resin (of Asia Kogyo Co., Ltd.) and the Excel Hardner HX IPDI-based crosslinking agent (of Asia Kogyo Co., Ltd.) in a solid weigh ratio of 6:4.

As for the above CB type A resin coating, #95 carbon (of Mitsubishi Kagaku Co., Ltd.) was used and a mixture of the EAU65B urethane-modified acrylic resin (of Asia Kogyo Co., Ltd.) and the Excel Hardner HX IPDI-based crosslinking agent (of Asia Kogyo Co., Ltd.) was selected as the coating resin. The solid weight ratio of the EAU65B to the Excel Hardner HX was 6:4.

To coat the above carbon, a mixed solution of the above urethane-modified acrylic resin and crosslinking agent dissolved in an MEK solvent was sprayed while #95 carbon was circulated by spir-a-flow (of Floint Co., Ltd.) to coat the surface of the above #95 carbon with the above resin and heated to produce resin coated #95 carbon particles.

As for the above CB type B resin coating, the MA100 carbon (of Mitsubishi Kagaku Co., Ltd.) was used and a mixture of the EAU65B urethane-modified acrylic resin (of Asia Kogyo Co., Ltd.), the KS555 quaternary ammonium perchlorate ion (of Kao Corporation) and the Excel Hardner HX IPDI-based crosslinking agent (of Asia Kogyo Co., Ltd.) was selected as the coating resin. The solid weight ratio of the EAU65B, the KS555 and the Excel Hardner HX was 6:0.48:4. Like the above CB type A coating, the above spiral flow device was used to coat the carbon.

Example 1-2

A charge roller was manufactured in the same manner as in Example 1-1 except that the CB type C resin coating comprising a mixture of DP307 urethane resin (of Sanyo Kagaku Co., Ltd.), the KS555 quaternary ammonium perchlorate ion (of Kao Corporation) and the Excel Hardner HX IPDI-based crosslinking agent (of Asia Kogyo Co., Ltd.) as the coating resin in the above CB type B resin coating was used in place of the CB type B resin coating.

The solid weight ratio of the DP307, the KS555 and the Excel Hardner HX was 4.5:0.36:1.

Reference Example 1-1

A charge roller was manufactured in the same manner as in Example 1-1 except that the CB type D resin coating comprising a mixture of the EAU65B urethane-modified acrylic resin (of Asia Kogyo Co., Ltd.) and the KS555 quaternary ammonium perchlorate ion (of Kao Corporation) as the coating resin in the above CB type B resin coating was used in place of the CB type B resin coating.

Reference Example 1-2

A charge roller was manufactured in the same manner as in Example 1-1 except that the coating layer X was omitted. Since the coating layer Y made from an organic solvent-based coating of this charge roller was directly formed on an urethane foam by the dipping method, the urethane foam swelled.

Comparative Example 1-1

A charge roller was manufactured in the same manner as in Example 1-1 except that the CB type E resin coating prepared by excluding the ion from the coating resin components in the CB type B resin coating was used in place of the CB type B resin coating.

Comparative Example 1-2

A charge roller was manufactured in the same manner as in Example 1-1 except that the CB type F resin coating prepared by excluding the ion from the coating resin components in the CB type B resin coating was used in place of the CB type B resin coating.

Comparative Example 1-3

A charge roller was manufactured in the same manner as in Example 1-1 except that MA100 carbon was directed used without being coated with a resin.

The measurement results of the characteristic properties of the charge rollers of Examples, Reference Examples and Comparative Examples thus manufactured and the results of an image output test and a contamination test which were carried out by mounting the above charge rollers to a printer are shown in the table of FIG. 3.

The measurement of the characteristic properties and the tests were carried out in accordance with the following methods.

(1) Amount of Resin Applied

The amount of a resin applied to carbon was calculated from a change in the weight of carbon coated with the resin by elevating the temperature to 800° C. at a rate of 20° C./min using a TGA device.

(2) Solvent Insolubility

After carbon coated with a resin was immersed in a MEK solution at 25° C. for 24 hours, it was dried at 100° C. for 5 hours to measure its weight after drying. The solvent insolubility was calculated according to the following equation from the amount of the resin before immersion and a change in weight before and after immersion measured by the TGA device.

$$\text{solvent insolubility } (\%)=(B/A)\times 100$$

wherein A is the weigh of the resin component contained in the resin coated conductive agent before immersion in the solvent and B is the weight of the resin component after the resin coated conductive agent is immersed in a good solvent at 25° C. for 24 hours.

(3) Surface Roughness of Roller

The 10-point average surface roughness of the manufactured charge roller was measured with a surface roughness meter (Surfcom 120A of Tokyo Seimitsu Co., Ltd.).

(4) Resistance of Roller and Variation in Resistance

The manufactured elastic roller and a metal drum were press-contacted with each other under a load of 500 g and 500 V was applied between the roller and the metal drum while they were turned to measure the resistance of the roller. The average value was taken as the resistance of the roller and the difference between the maximum resistance and the minimum resistance during one rotation of the roller was taken as a variation in the resistance of the roller.

(5) Image Output Test and Contamination Test

The manufactured charge roller was mounted to a commercially available LBP (Laser Beam Printer) to output an image (half-tone image) so as to judge the condition of the image visually.

After the manufactured charge roller and the OPC drum were press-contacted to each other under a load of 1,000 kg and left at 40° C. and 85% RH for 10 days, the OPC drum was mounted to a printer to output 10 copies of the image. The contamination state was judged according to the condition of the image when 10 copies of the image were printed. When a linear defect was observed at an image position corresponding to the above press-contacting portion, the condition of the image was judged as NG.

As obvious from the measurement results of the characteristic properties and the results of the tests shown in FIG. 3, the charge rollers of Examples 1-1 and 1-2 according to Embodiment 1 of the present invention had a small variation in resistance and stable resistance, could obtain an excellent image and were free from a contamination problem when they were mounted to a printer.

In contrast to this, as conductivity was not compensated for in Comparative Examples 1-1 and 1-2 in which the ion was removed from the coating resin components of the above Examples 1-1 and 1-2, the resistance values of the rollers increased, a variation in resistance became large and image uniformity was not obtained when the charge rollers were mounted to a printer. Further, in Comparative Example 1-3 in which carbon was used directly, though the resistance value of the roller could be adjusted, dispersibility was low, the surface roughness of the roller was high, and a variation in resistance became larger by one digit or more. Further, when the charge roller was mounted to a printer, image uniformity was the worst.

Meanwhile, a contamination problem arose in Reference Example 1-1 in which the crosslinking agent of Example 1-1 was omitted, and the urethane foam swelled as described above, the surface roughness of the roller was high, and the image slightly deteriorated in Reference Example 1-2 in which the coating layer X of Example 1-1 was omitted.

Embodiment 2

In the above Embodiment 1, the coating layer 13 containing a conductive agent coated with an ion-containing resin is formed on the surface of the substrate 12 such as an elastic material. In Embodiment 2, a resin having high charge attenuation properties (charge attenuation is fast) in spite of high volume resistance is used as the resin for coating the conductive agent in place of the ion-containing resin to solve an antinomic problem between dispersibility and conductivity.

The above charge attenuation properties are obtained by using a film having a thickness of 3 to 10 μm formed from the coating resin and measuring a change in the surface potential of the film when the surface of the film is charged by corona discharge generated by applying a voltage of 8 kV to a corona discharger spaced 1 mm apart from the surface of the film. In this Embodiment 2, a resin whose maximum surface potential becomes 300 V or less, preferably 200 V or less after 0.3 second is selected as the coating resin.

The reason why the surface potential is measured after 0.3 second in the measurement of the above charge attenuation properties is given below. In the above measurement, it is impossible to start the measurement of surface potential simultaneously with corona discharge and it is not preferred to use the initial value of surface potential because it is unstable. Then, in the case of a charge roller in the electrophotographic process, since the revolution speed is generally 0.3 sec per revolution, it is judged that it is appropriate to regulate the control of surface potential by the above time.

Figure 4:
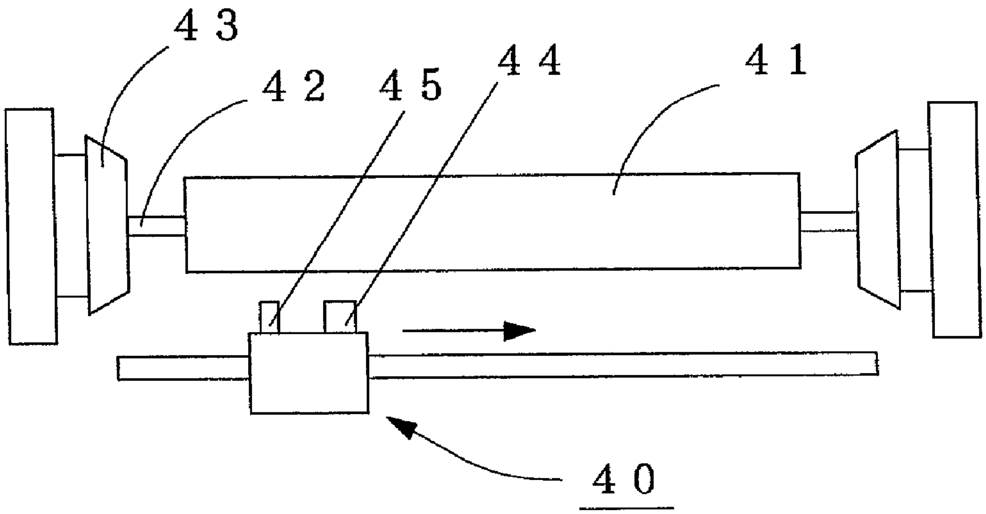
FIG. 4 is a diagram showing the method of measuring the surface potential of a charge member.

The above surface potential is measured by the CRT2000 Charge Roller Test System of Quality Engineering Associates, Inc. of the US. FIG. 4 is a schematic diagram of the key section of the system. That is, the following method of measuring the surface potential is preferably used. Both ends of the shaft 42 of a metal roller 41 to be tested and coated with a resin are held by chucks 43, a measuring unit 40 comprising a small-sized Scorotron charger 44 and a surface electrometer 45 which are spaced apart from each other by a predetermined distance is opposed to the surface of the roller 41 at an interval of 1 mm, and the measuring unit 40 is moved from one end to the other end of the roller 41 at a constant speed while the roller 41 is kept at a standstill to measure the surface potential of the roller 41 while surface charge is applied to the roller 41.

Since the surface potential depends on temperature and humidity, the measurement is carried out at normal temperature and normal humidity as standard conditions (20° C./50% RH). Corona discharge applied from the Scorotron charger 44 to the roller 41 is negative charge and the application voltage is 8 kV. The speed of the measuring unit 40 is adjusted such that the surface potential is measured 0.3 second after corona discharge is applied to the roller 41.

Any type of coating resin is acceptable as the above coating resin if it satisfies the requirement for charge attenuation. Examples of the coating resin include urethane resin, acrylic resin, polyester resin, urethane-modified acrylic resin, silicone resin, nylon resin, epoxy resin, styrene resin, butyral resin, vinylidene chloride resin, melamine resin, phenolic resin and fluororesin. They may be used alone or in combination of two or more. Urethane resin, fluororesin, silicone resin and urethane-modified acrylic resin are particularly preferred. Further, it is preferred that at least one resin identical to the material forming the elastic layer to be described hereinafter should be contained. In this Embodiment 2, when the coating layer containing a conductive agent coated with the above resin is formed on the surface of an elastic material which is a substrate, the dispersibility of the above conductive agent can be controlled more easily and a variation in resistance and dependence of resistance on voltage can be made smaller than when a conductive agent such as ordinary carbon or metal oxide is used as it is.

The amount of the resin applied is 0.01 to 50 wt %, preferably 0.01 to 30 wt %, more preferably 0.01 to 20 wt % based on the conductive agent to be coated. Below the above range, a satisfactory dispersibility improving effect is not obtained and above the range, satisfactory conductivity is not obtained as will be described hereinafter.

If the resin is simply applied, conductivity intrinsic to the above conductive agent will be lost as a matter of course and the conductivity of the resistance control layer which is a coating film containing the conductive agent will be hardly exhibited though dispersibility can be controlled. Then, in Embodiment 2, as above mentioned resin having high charge attenuation properties (charge attenuation is fast) in spite of high volume resistance is used as the resin for coating the conductive agent to solve an antinomic problem between dispersibility and conductivity.

The conductive agent to be coated is a so-called conductive material such as carbon, metal or metal oxide. Specific examples of the conductive agent include conductive carbons such as ketjen black and acetylene black, rubber carbons such as SAF, ISAF, HAF, FEF, GPF, SRF, FT and MT, oxidized ink carbon, pyrolytic carbon, natural graphite, metals such as nickel, copper, silver and germanium, and metal oxides such as antimony doped tin oxide, titanium oxide and zinc oxide.

The method of applying the above resin may be the same as in the above Embodiment 1.

As for the conductive agent coated with the above resin, the solvent insolubility of the above resin component represented by the following relational expression is preferably 50% or more, particularly preferably 70% or more like the above Embodiment 2.

$$\text{solvent insolubility } (\%) = (B/A) \times 100$$

wherein A is the weight of the resin component contained in the resin coated conductive agent before immersion in a solvent and B is the weight of the resin component after the resin coated conductive agent is immersed in a good solvent at 25° C. for 24 hours.

If the above solvent insolubility is lower than 50%, when the semiconductive member of Embodiment 2 is used as a semiconductive roller such as a charge roller, development roller, transfer roller or discharge roller to be mounted to an electrophotographic apparatus such as a printer, copier or facsimile, a portion contacting a photosensitive body such as OPC will be contaminated and an image trouble will occur.

As the solvent for measuring the above solvent insolubility is preferably used methyl ethyl ketone for fluororesin, methanol for polyamide resin, methyl ethyl ketone or toluene for urethane-modified acrylic resin, acetone or isopropanol for melamine resin, or toluene for silicone resin. The resin for forming the coating layer containing the above resin coated conductive agent and the elastic material for forming the elastic layer underlying the coating layer may be the same resin and elastic material as those of the above Embodiment 1, respectively.

The above coating layer may be a single layer or a laminate consisting of multiple layers. Although the thickness thereof may be suitably selected, it is generally 0.5 to 500 μm.

The resistance of the above coating layer is suitably selected but it is preferably controlled to a semiconductive range of $10^4$ to $10^{14}$ Ω·cm, particularly preferably $10^4$ to $10^9$ Ω·cm. In the semiconductive range where the resistance readily varies, a variation in resistance can be effectively reduced by adding the resin coated conductive agent of the present invention to the coating layer.

Since the object of the present invention is to reduce a variation in resistance, the semiconductive member is desirably uniform in shape and preferably has a 10-point average surface roughness Rz of 4 μm or less.

EXAMPLES

Examples of Embodiment 2 of the present invention and Comparative Examples are provided for the purpose of further illustrating the present invention but are in no way to be taken as limiting.

Example 2-1

A charge roller having a 100 μm-thick resin layer X formed on the surface of an elastic layer made of a conductive urethane foam and a 10 μm-thick resin layer Y formed on the resin layer X was manufactured.

The resin layer X was formed from a coating prepared by adding 30 phr of the following CB type A resin coating to a mixture of the Bironal MD1930 water-dispersible polyester resin (of Toyobo Co., Ltd.) and the U40 water-dispersible urethane resin (of Sumitomo Viel Urethane Co., Ltd.) in a ratio of 7:3.

The resin layer Y was formed from a coating prepared by adding 12 phr of the following CB type B resin coating to a mixture of the EAU65B urethane-modified acrylic resin (of Asia Kogyo Co., Ltd.) and the Excel Hardner HX IPDI-based crosslinking agent (of Asia Kogyo Co., Ltd.) in a solid weight ratio of 6:4.

As for the above CB type A resin coating, #95 carbon (of Mitsubishi Kagaku Co., Ltd.) was used and a mixture of the EAU65B urethane-modified acrylic resin (of Asia Kogyo Co., Ltd.) and the Excel Hardner HX IPDI-based crosslinking agent (of Asia Kogyo Co., Ltd.) was selected as the coating resin. The solid weight ratio of the EAU65B to the Excel Hardner HX was 6:4.

To coat the above carbon, a mixed solution of the above urethane-modified acrylic resin and crosslinking agent dissolved in an MEK solvent was sprayed while #95 carbon was circulated by spir-a-flow (of Floint Co., Ltd.) to coat the surface of the above #95 carbon with the above resin and heated to produce resin coated #95 carbon particles.

As for the above CB type B resin coating, the Denka Black Carbon (of Denki Kagaku Kogyo Co., Ltd.) was used and a mixture of the EAU65B urethane-modified acrylic resin (of Asia Kogyo Co., Ltd.) and the Excel Hardner HX IPDI-based crosslinking agent (of Asia Kogyo Co., Ltd.) was selected as the coating resin. The solid weight ratio of the EAU65B to the Excel Hardner HX was 6:4. Like the above CB type A coating resin, the above spiral flow device was used to coat the carbon.

Example 2-2

A charge roller was manufactured in the same manner as in Example 2-1 except that the CB type C resin coating comprising a mixture of the DP307 urethane resin (of Sanyo Kagaku Co., Ltd.) and the Excel Hardner HX IPDI-based crosslinking agent (of Asia Kogyo Co., Ltd.) as the coating resin in the above CB type B resin coating was used in place of the CB type B resin coating used in the above Example 2-1.

The ratio of the DP307 to the Excel Hardner HX was 4.5:1.

Reference Example 2-1

A charge roller was manufactured in the same manner as in Example 2-1 except that the CB type D resin coating prepared by increasing the content of the coating resin by adjusting the conditions for spraying the coating in Example 2-1 was used in place of the CB type B resin coating used in the above Example 2-1.

Reference Example 2-2

A charge roller was manufactured in the same manner as in Example 2-1 except that the CB type E resin coating comprising a mixture of the AER6071 epoxy resin having low charge attenuation properties (of Asahi Kasei Co., Ltd.) and the Sumicure M curing agent (of Sumitomo Kagaku Co., Ltd.) as the coating resin in the above CB type B resin coating was used in place of the CB type B resin coating used in the above Example 2-1.

Reference Example 2-3

A charge roller was manufactured in the same manner as in Example 2-1 except that the CB type F resin coating comprising only the EAU65B urethane-modified acrylic resin as the coating resin in the above CB type B resin coating was used in place of the CB type B resin coating used in the above Example 2-1.

Reference Example 2-4

A charge roller was manufactured in the same manner as in Example 2-1 except that the coating layer X was omitted. Since the coating layer Y made from an organic solvent-based coating was formed on the urethane foam directly by the dipping method, the urethane foam swelled.

Comparative Example 2

A charge roller was manufactured in the same manner as in Example 2-1 except that the Denka Black Carbon was used directly without being coated with a resin.

The measurement results of the characteristic properties of the charge rollers of Examples, Reference Examples and Comparative Example thus manufactured and the results of an image output test and a contamination test which were carried out by mounting the above charge rollers to a printer are shown in the table of FIG. 5.

The measurement of the characteristic properties and the tests were carried out in accordance with the following methods.

(1) Charged Potential of Coating Resin

A metal roller having the same diameter as the charge roller was coated with a coating resin alone to a thickness of 5 μm to produce a sample roller to be inspected. The surface of this sample roller was charged by corona discharge generated by applying a voltage of 8 kV to a Scorotron charger spaced 1 mm apart from the roller using the CRT2000 device of QAE Co., Ltd. After 0.3 second, the surface potential of the roller was measured. The measurement was carried out at normal temperature and normal humidity (20° C. and 50% RH). (2) The amount of resin applied, (3) solvent insolubility, (3) surface roughness of roller and (4) resistance of roller and variation in resistance were measured in the same manner as in the above Embodiment 1.

(6) Image Output Test and Contamination Test

The manufactured charge roller was mounted to a commercially available LBP to output an image (white) so as to judge the condition of the image visually.

After the manufactured charge roller and the OPC drum were press-contacted to each other under a load of 1,000 kg and left at 40° C. and 85% RH for 10 days, the OPC drum was mounted to a printer to output 10 copies of the image. The contamination state was judged according to the condition of the image when 10 copies of the image were printed. When a linear defect was observed at an image position corresponding to the above press-contacting portion, the condition of the image was judged as NG.

As obvious from the measurement results of the characteristic properties and the results of the tests shown in FIG. 5, the charge rollers of Examples 2-1 and 2-2 according to Embodiment 2 of the present invention had a small variation in resistance and stable resistance, could obtain an excellent image and were free from a contamination problem when they were mounted to a printer.

In contrast to this, in Comparative Example 2 in which carbon was directly used, though the resistance value of the roller could be adjusted, dispersibility was low, the surface roughness of the roller was high, and a variation in resistance became larger by one digit or more. Further, when the charge roller was mounted to a printer, a sand-like pattern was observed on the image.

Meanwhile, in Reference Example 2-1 in which the amount of coating in the above Example 2-1 was increased and Reference Example 2-2 in which a resin having low charge attenuation properties was used as the coating resin, a variation in resistance was small but the resistance greatly increased. When the charge rollers of these Reference Examples were mounted to a printer, the condition of an image was almost normal.

In Reference Example 2-3 in which the crosslinking agent of Example 2-1 was omitted, a contamination problem arose though the obtained image was normal, in Reference Example 2-4 in which the coating layer X of Example 2-1 was omitted, the urethane foam swelled as described above, whereby the surface roughness of the roller was raised, the resistance of the roller increased, and a sand-like pattern was slightly observed on the image.

Embodiment 3

In the above Embodiment 1, the resistance control layer which is a coating film 13 containing a conductive agent coated with an ion-containing resin is formed on the surface of the substrate 12 such as an elastic material to obtain a semiconductive member having little variation in resistance stably. By adding a conductive agent coated with an ion-containing resin to an elastic material such as urethane or rubber which is a substrate, a semiconductive member having little variation in resistance can be obtained stably.

The semiconductive member of this Embodiment 3 is used as a member such as a charge roller, development roller, transfer roller or discharge roller mounted to an electrophotographic apparatus such as a printer, copier or facsimile. The semiconductive member is not limited to a specific shape but may be shaped like a roll, plate or block. In general, it is preferably shaped like a roll. In the case of a roll, the semiconductive member is used as, for example, a charge roller 50 which comprises a metal or plastic shaft 51, an elastic layer 52 made from a semiconductive elastic material containing a conductive agent formed around this shaft 51 and an outer layer 53 formed on the above elastic layer 52 as shown in FIG. 6(*a*) and FIG. 6(*b*).

In this Embodiment 3, a semiconductive member having a semiconductive elastic material containing a resin coated conductive agent as the elastic material which is a substrate is obtained. That is, when the conductive agent coated with an ion-containing resin is used as the above conductive agent, the dispersibility of the conductive agent can be controlled more easily and a variation in resistance and dependence of resistance on voltage can be made smaller than when a conductive agent such as carbon or metal oxide is used as it is.

The amount of the resin applied is 0.01 to 50 wt %, preferably 0.01 to 30 wt %, more preferably 0.01 to 20 wt % based on the original conductive agent. Below the above range, a satisfactory dispersibility improving effect is not obtained and above the range, satisfactory conductivity is not obtained was aforementioned.

The above coating resin, the ion to be added to the coating resin and the method of applying the above resin are the same as in the above Embodiment 1.

The conductive agent to be coated is a so-called conductive material such as carbon, metal or metal oxide. Specific examples of the conductive agent include conductive carbons such as ketjen black and acetylene black, rubber carbons such as SAF, ISAF, HAF, FEF, GPF, SRF, FT and MT, oxidized ink carbon, pyrolytic carbon, natural graphite, metals such as nickel, copper, silver and germanium, and metal oxides such as antimony doped tin oxide, titanium oxide and zinc oxide.

As for the above conductive agent coated with the resin, the solvent insolubility of the above resin component represented by the following relational expression is preferably 50% or more, particularly preferably 70% or more.

$$\text{solvent insolubility } (\%) = (B/A) \times 100$$

wherein A is the weight of the resin component contained in the resin coated conductive agent before immersion in a solvent and B is the weight of the resin component after the resin coated conductive agent is immersed in a good solvent at 25° C. for 24 hours.

If the above solvent insolubility is lower than 50%, when the semiconductive member is used as a semiconductive roller such as a charge roller, development roller, transfer roller or discharge roller to be mounted to an electrophotographic apparatus such as a printer, copier or facsimile, a portion contacting a photosensitive body such as OPC will be contaminated and an image trouble will occur.

The elastic material to be mixed with the conductive agent coated with an ion-containing resin is not particularly limited, as exemplified by urethane rubber, silicone rubber, nitrile rubber, ethylene propylene rubber, ethylene propylene diene rubber, styrene butadiene rubber, butadiene rubber, isoprene rubber, natural rubber, acrylic rubber, chloroprene rubber, butyl rubber and epichlorohydrin rubber. They may be used alone or in combination of two or more. Urethane rubber, silicone rubber and ethylene propylene rubber are particularly preferred. A filler such as silica or calcium carbonate, plasticizer, crosslinking accelerator, aging inhibitor and pigment may be suitably blended as required.

The above elastic material may be a foamed material. In this case, the density of the material is preferably 0.05 to 0.9 g/cm$^3$.

The resistance of the above elastic material containing the conductive agent coated with an ion-containing resin is suitably selected but it is preferably controlled to a semiconductive range of $10^2$ to $10^{14}$ Ω·cm, particularly preferably $10^2$ to $10^9$ Ω·cm. In the semiconductive range where the resistance readily varies, a variation in the resistance of the semiconductive member and dependence of resistance on voltage can be effectively reduced by adding the resin coated conductive agent of the present invention.

The material for forming the outer layer formed on the surface of the semiconductive member as required is not particularly limited but it is preferably a material capable of providing flexibility and smoothness to the surface. Specific examples of the material include polyester resin, acrylic resin, urethane resin, urethane-modified acrylic resin, nylon resin, epoxy resin, polyvinyl acetal resin, vinylidene chloride resin, fluororesin and silicone resin.

Further, this resin layer may contain suitable additives such as a conductive agent, crosslinking agent and thickener in suitable amounts as required.

The semiconductive member of this Embodiment 3 is advantageously used as a member such as a charge roller, development roller, transfer roller or discharge roller to be mounted to an electrophotographic apparatus such as a printer, copier or facsimile. More specifically, it is used as, for example, a charge unit for a printer as shown in FIG. 2. Since the semiconductive member of this Embodiment 3 has a small variation in resistance and stable resistance and hardly causes a contamination problem, an electrophotographic apparatus capable of obtaining an excellent image can be provided stably.

EXAMPLES

Examples of Embodiment 3 of the present invention and Comparative Examples are provided for the purpose of further illustrating the present invention but are in no way to be taken as limiting.

Example 3-1

The Denka Black Carbon (of Denki Kagaku Co., Ltd.) was used as the conductive agent and a mixture of the EAU65B urethane-modified acrylic resin (of Asia Kogyo Co., Ltd.), the KS555 quaternary ammonium perchlorate ion (of Kao Corporation) and the Excel Hardner HX IPDI-based crosslinking agent (of Asia Kogyo Co., Ltd.) was selected as the coating resin. The solid weight ratio of the EAU65B, the KS555 and the Excel Hardner HX was 6:0.48:4.

To coat the above carbon, a mixed solution of the above urethane-modified acrylic resin, ion and crosslinking agent dissolved in an MEK solvent was sprayed while the Denka Black Carbon was circulated by a spir-a-flow (of Floint Co., Ltd.) to coat the surface of the above Denka Black Carbon with the above resin and heated to produce resin coated Denka Black Carbon particles.

An elastic material was produced using this resin coated Denka Black Carbon. An elastic roller A having a conductive elastic material having a length of 2 cm and a thickness of 0.6 cm formed on a metal shaft was manufactured by mixing together 80 g of the Sanix GR5000 polyether-based polyol (of Sanyo Kasei Co., Ltd.), 20 g of the PTG1000SN trimethylene glycol-based polyol (of Hodogaya Kagaku Co., Ltd.), 23 g of the Ruplanate MB301 MID-based isocyanate (of BASF Co., Ltd.), 4 g of the SF2941F foam stabilizer (of Toray Dow Corning Co., Ltd.) and 8 g of the above resin coated CB by a mixer, casting the obtained mixture into a mold having the metal shaft therein, curing it at 90° for 6 hours, and polishing the cured product.

Example 3-2

An elastic roller B was manufactured in the same manner as in Example 3-1 except that a mixture of the DP307 urethane resin (of Sanyo Kasei Co., Ltd.), the KS555 quaternary ammonium perchlorate ion (of Kao Corporation) and the Excel Hardner HX IPDI-based crosslinking agent (of Asia Kogyo Co., Ltd.) was used as the coating resin.

The solid weight ratio of the DP307, the KS555 and the Excel Hardner HX was 4.5:0.36:1.

Example 3-1

An elastic roller C was manufactured in the same manner as in Example 3-1 except that a mixture of the EAU65B urethane-modified acrylic resin (of Asia Kogyo Co., Ltd.) and the KS555 quaternary ammonium perchlorate ion (of Kao Corporation) was used as the coating resin.

Comparative Example 3-1

An elastic roller D was manufactured in the same manner as in Example 3-1 except that the ion was removed from the coating resin components.

Comparative Example 3-2

An elastic roller E was manufactured in the same manner as in Example 3-1 except that the Denka Black Carbon was directly used without being coated with a resin.

The measurement results of the characteristic properties of the elastic rollers of Examples, Reference Example and Comparative Examples thus manufactured and the results of a contamination test which was carried out by mounting the above elastic rollers to a printer are shown in the table of FIG. 7.

The characteristic properties were measured in accordance with the methods (1) to (4) shown in the above Embodiment 1. The contamination test was carried out as follows.

(5) Contamination Test

After the manufactured elastic roller and the OPC drum were press-contacted to each other under a load of 1,000 kg and left at 40° C. and 85% RH for 10 days, the OPC drum was mounted to a printer to output 10 copies of the image. The contamination state was judged according to the condition of the image when 10 copies of the image were printed. When a linear defect was observed at an image position corresponding to the above press-contacting portion, the condition of the image was judged as NG.

As obvious from the measurement results of the characteristic properties and the results of the test shown in FIG. 7, the elastic rollers of Examples 3-1 and 3-2 according to Embodiment 3 of the present invention had a small variation in resistance and stable resistance and were free from a contamination problem when they were mounted to the printer.

In contrast to this, in Comparative Example 3-1 in which the ion was removed from the coating resin components, since conductivity was not compensated for, the resistance of the roller greatly increased. In Comparative Example 3-2 in which carbon was directly used, though the resistance value of the roller could be adjusted, dispersibility was low and a variation in resistance became larger by one digit or more.

Further, in Reference Example 3-1 in which the crosslinking agent of Example 1 was omitted, though the resistance and its variation decreased, a contamination problem arose.

Embodiment 4

In the above Embodiment 3, the conductive agent coated with an ion-containing resin is contained in the elastic material 51 such as urethane or rubber which is the substrate. When a resin having high charge attenuation properties in spite of high volume resistance as described in the above Embodiment 2 is used as the resin for coating the above conductive agent in place of the ion-containing resin, the same effect can be obtained.

The amount of the above resin applied is 0.01 to 50 wt %, preferably 0.01 to 30 wt %, more preferably 0.01 to 20 wt % based on the conductive agent to be coated. Below the above range, a satisfactory dispersibility improving effect is not obtained and above the range, satisfactory conductivity is not obtained was aforementioned.

The elastic material containing the conductive agent coated with the resin may be the elastic material of the above Embodiment 3. The above elastic material may be a foamed material. In this case, the density of the material is preferably 0.05 to 0.9 g/cm$^3$.

The resistance of the elastic material containing the conductive agent coated with the resin is suitably selected but it is preferably controlled to a semiconductive range of $10^2$ to $10^{14}$ Ω·cm, particularly preferably $10^2$ to $10^9$ Ω·cm. In the semiconductive range where the resistance readily varies, a variation in the resistance of the semiconductive member and dependence of resistance on voltage can be effectively reduced by adding the resin coated conductive agent of this Embodiment 4.

The material for forming the outer layer formed on the surface of the semiconductive member as required is not particularly limited but it is preferably a material capable of providing flexibility and smoothness to the surface. Specific examples of the material include polyester resin, acrylic resin, urethane resin, urethane-modified acrylic resin, nylon resin, epoxy resin, polyvinyl acetal resin, vinylidene chloride resin, fluororesin and silicone resin.

Further, this resin layer may contain suitable additives such as a conductive agent, crosslinking agent and thickener in suitable amounts as required.

EXAMPLES

Examples of Embodiment 4 of the present invention and Comparative Examples are provided for the purpose of further illustrating the present invention but are in no way to be taken as limiting.

Example 4-1

The FT carbon (of Asahi Carbon Co., Ltd.) was used as the conductive agent and a mixture of the EAU65B urethane-modified acrylic resin (of Asia Kogyo Co., Ltd.) and the Excel Hardner HX IPDI-based crosslinking agent (of Asia Kogyo Co., Ltd.) was selected as the coating resin. The solid weight ratio of the EAU65B to the Excel Hardner HX was 6:4.

To coat the above carbon, a mixed solution of the above urethane-modified acrylic resin and crosslinking agent dissolved in an MEK solvent was sprayed while the FT carbon was circulated by a spir-a-flow (of Floint Co., Ltd.) to coat the surface of the above FT carbon with the above resin and heated to produce resin coated FT carbon particles.

An elastic material was produced using this resin coated FT carbon. An elastic roller A having a conductive elastic material with a length of 2 cm and a thickness of 0.6 cm formed on a metal shaft was manufactured by mixing together 100 g of the Sanix GR5000 polyether-based polyol (of Sanyo Kasei Co., Ltd.), 23 g of the Ruplanate MB301 MID-based isocyanate (of BASF Co., Ltd.), 4 g of the SF2941F foam stabilizer (of Toray Dow Corning Co., Ltd.) and 10 g of the above resin coated CB by a mixer, casting the obtained mixture into a mold having the metal shaft therein, curing it at 90° for 6 hours, and polishing the cured product.

Example 4-2

An elastic roller B was manufactured in the same manner as in Example 4-1 except that a mixture of the DP307 urethane resin (of Sanyo Kasei Co., Ltd.) and the Excel Hardner HX IPDI-based crosslinking agent (of Asia Kogyo Co., Ltd.) was used as the coating resin.

The solid weight ratio of the DP307 to the Excel Hardner HX was 4.5:1.

Reference Example 4-1

An elastic roller C was manufactured in the same manner as in Example 4-1 except that the conditions for spraying a coating were adjusted to increase the amount of the coating resin.

Reference Example 4-2

An elastic roller D was manufactured in the same manner as in Example 4-1 except that a mixture of the AER6071 epoxy resin having low charge attenuation properties (of Asahi Kasei Co., Ltd.) and the Sumicure M curing agent (of Sumitomo Kagaku Co., Ltd.) was used as the coating resin.

Reference Example 4-3

An elastic roller E was manufactured in the same manner as in Example 4-1 except that only the EAU65B urethane-modified acrylic resin was used as the coating resin.

Comparative Example 4

An elastic roller F was manufactured in the same manner as in Example 4-1 except that the FT carbon was directly used without being coated with a resin.

The measurement results of the characteristic properties of the elastic rollers of Examples, Reference Examples and Comparative Example thus manufactured and the results of a contamination test which was carried out by mounting the above elastic rollers to a printer are shown in the table of FIG. 8.

The characteristic properties was measured in accordance with the methods (1) to (5) shown in the above Embodiment 2. The contamination test was carried out as follows.

(6) Contamination Test

After the manufactured elastic roller and the OPC drum were press-contacted to each other under a load of 1,000 kg and left at 40° C. and 85% RH for 10 days, the OPC drum was mounted to a printer to output 10 copies of the image. The contamination state was judged according to the condition of the image when 10 copies of the image were printed. When a linear defect was observed at an image position corresponding to the above press-contacting portion, the condition of the image was judged as NG.

As obvious from the measurement results of the characteristic properties and the results of the test shown in FIG. 8, the elastic rollers of Examples 4-1 and 4-2 according to Embodiment 4 of the present invention had a small variation in resistance and stable resistance and were free from a contamination problem when they were mounted to the printer.

In contrast to this, in Comparative Example 4 in which the carbon was directly used without being coated with a resin, though the resistance value of the roller could be adjusted, dispersibility was low and a variation in resistance became larger by one digit or more.

Further, in Reference Example 4-1 in which the amount of the coating was increased and Reference Example 4-2 in which a resin having low charge attenuation properties was used as the coating resin, the resistance greatly increased in spite of a small variation in resistance. In Reference Example 4-3 in which the crosslinking agent of Example 4-1 was omitted, though the resistance and its variation were almost the same as those of Example 4-1, a contamination problem arose.

INDUSTRIAL FEASIBILITY

As described above, according to the present invention, in a semiconductive member having a coating film containing a conductive agent formed on the surface of a substrate such as an elastic material, the above conductive agent is coated with an ion-containing resin or a resin having high charge attenuation properties. Therefore, a semiconductive member having a small variation in resistance and stable resistance can be obtained.

By adding a conductive agent coated with an ion-containing resin or a resin having high charge attenuation properties to an elastic material such as urethane or rubber which is a substrate, a semiconductive member having a small variation in resistance can be obtained stably.

When the above semiconductive member is used as a member such as a charge roller, development roller, transfer roller, discharge roller or development blade for use in an electrophotographic apparatus such as a printer, copier or facsimile, an electrophotographic apparatus capable of obtaining an excellent image stably can be provided.

What is claimed is:

1. A semiconductive member comprising a coating layer formed on a surface of a substrate, wherein said coating layer comprises a conductive agent coated with a resin having an ion previously added.

2. The semiconductive member of claim 1, wherein said semiconductive member has a surface roughness of 4 μm or less.

3. The semiconductive member of claim 1, wherein the amount of said resin applied is 0.01 to 50 wt % based on said conductive agent.

4. The semiconductive member of claim 1, wherein said conductive agent is at least one of carbon, metal powder and metal oxide, or a mixture thereof.

5. The semiconductive member of claim 1, wherein in said conductive agent coated with said resin, the solvent insolubility of the resin component represented by the following relational expression is 50% or more:

$$\text{solvent insolubility (\%)}=(B/A)\times 100$$

wherein A is the weight of the resin component contained in said resin coated conductive agent before immersion in a solvent and B is the weight of the resin component after said resin coated conductive agent is immersed in a good solvent at 25° C. for 24 hours.

6. An electrophotographic apparatus comprising said semiconductive member of claim 1.

* * * * *